(12) United States Patent
Deluca et al.

(10) Patent No.: US 9,749,268 B2
(45) Date of Patent: Aug. 29, 2017

(54) SYSTEM AND METHOD FOR MESSAGE DELIVERY

(71) Applicant: INTERNATIONAL BUSINESS MACHINES CORPORATION, Armonk, NY (US)

(72) Inventors: Lisa Seacat Deluca, Baltimore, MD (US); Brian M. O'Connell, Research Triangle Park, NC (US); Clifford A. Pickover, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/962,500

(22) Filed: Dec. 8, 2015

(65) Prior Publication Data

US 2017/0163578 A1   Jun. 8, 2017

(51) Int. Cl.
*H04L 12/58*   (2006.01)
*H04W 4/12*   (2009.01)
*H04W 8/22*   (2009.01)
*H04W 4/22*   (2009.01)

(52) U.S. Cl.
CPC ............ *H04L 51/043* (2013.01); *H04L 51/24* (2013.01); *H04W 4/12* (2013.01); *H04W 4/22* (2013.01); *H04W 8/22* (2013.01)

(58) Field of Classification Search
CPC ........... G06F 17/30598; H04L 61/1594; H04L 51/043
See application file for complete search history.

(56) References Cited

U.S. PATENT DOCUMENTS

| | | |
|---|---|---|
| 6,477,117 B1 | 11/2002 | Narayanaswami et al. |
| 7,444,384 B2 | 10/2008 | Horvitz |
| 8,466,790 B2 | 6/2013 | Palin et al. |
| 8,519,950 B2 | 8/2013 | Radivojevic et al. |
| 2004/0177072 A1 | 9/2004 | Salminen et al. |

(Continued)

FOREIGN PATENT DOCUMENTS

| | | |
|---|---|---|
| EP | 2457137 | 5/2012 |
| WO | 2011011750 | 1/2011 |
| WO | 2012170283 | 12/2012 |

OTHER PUBLICATIONS

Zimmerman, Thoams Guthrie. "Personal area networks: near-field intrabody communication." IBM Systems Journal 35.3.4 (1996): 609-617.

(Continued)

*Primary Examiner* — Myron K Wyche
(74) *Attorney, Agent, or Firm* — F. Chau & Associates, LLC (57) ABSTRACT

A message delivery system includes a plurality of smart devices associated with a person. Each smart device includes the person's contact information and a wireless transceiver for communicating with each of the other smart devices and communicating messages directed to the person. A message handling module having stored codes executable by a processor is embedded within one of the smart devices to receive current device status of each of the smart devices and to determine a chosen smart device to receive a current message directed to the person based on criteria including the current device status.

20 Claims, 8 Drawing Sheets

(56) References Cited

U.S. PATENT DOCUMENTS

| | | | |
|---|---|---|---|
| 2007/0043687 A1 | 2/2007 | Bodart et al. | |
| 2010/0208424 A1* | 8/2010 | Swan | G06F 1/1632 361/679.56 |
| 2012/0235883 A1 | 9/2012 | Border et al. | |
| 2013/0198694 A1 | 8/2013 | Rahman et al. | |
| 2013/0201004 A1 | 8/2013 | Hart et al. | |
| 2014/0365469 A1* | 12/2014 | Daskal | G06F 17/30598 707/722 |
| 2015/0356081 A1* | 12/2015 | Cronin | G06F 17/30247 348/231.3 |
| 2016/0165065 A1* | 6/2016 | Damstra | H04L 61/1594 455/408 |

OTHER PUBLICATIONS

Mell, Peter, and Grance, Timothy. "The NIST definition of cloud computing." (2011).

* cited by examiner

SYSTEM AND METHOD FOR MESSAGE DELIVERY

BACKGROUND

Exemplary embodiments of the present invention relate to a system and method for message delivery. More particularly, exemplary embodiments of the present invention relate to a system and method for message delivery routing to personalized devices.

Generally, the number of smart devices carried by individuals has been increasing over time. Many individuals may simultaneously carry multiple smart devices or personal devices, each of which may be capable of receiving data, messages, alerts or other communications. Each smart device may be manufactured by a different vendor or manufacturer. For example, an individual may carry a smart phone, a smart watch and smart glasses simultaneously, and each smart device may be capable of receiving the data, messages, alerts or communications.

When individuals carry multiple smart devices simultaneously, it may become redundant or even burdensome to have multiple devices receiving the same message at the same time. For example, a message may be sent to the individual, and alerts may be generated in more than one of the individual's smart phone, smart watch and smart glasses. However, it may be less burdensome for the individual to receive only a single version of the message on only one available smart device or personal device. Alternatively, an individual carrying multiple smart devices may be in a geographic location or in an environment where they do not wish to receive any messages on any of their personal devices. Thus, it may be desirable to coordinate and manage the flow of information and delivery of messages between multiple smart devices or personal devices.

SUMMARY

Exemplary embodiments of the present invention provide a message delivery system including a plurality of smart devices associated with a person. Each smart device includes the person's contact information and a wireless transceiver for communicating with each of the other smart devices and communicating messages directed to the person. A message handling module having stored codes executable by a processor is embedded within one of the smart devices to receive a current device status of each of the smart devices and to determine a chosen smart device to receive a current message directed to the person based on criteria including the current device status.

According to an exemplary embodiment of the present invention the criteria may include information entered in one or more calendars stored in one or more of the smart devices.

According to an exemplary embodiment of the present invention the criteria may include an extent of accessibility of the smart devices.

According to an exemplary embodiment of the present invention the current device status may include status of a smart device's power source.

According to an exemplary embodiment of the present invention the current device status may include device on or off.

According to an exemplary embodiment of the present invention the criteria may include the person's notification profile.

According to an exemplary embodiment of the present invention the information entered in one or more calendars may include at least one of time of meeting, names, titles, nature of attendees, or meeting topics.

According to an exemplary embodiment of the present invention at least one of the smart devices may include a motion detector for detecting movement of at least one smart device.

According to an exemplary embodiment of the present invention the criteria may include a confidence level that the person is attempting to access one or more smart devices.

According to an exemplary embodiment of the present invention the criteria may include stored data representing the person's repeated places of travel or repeated patterns of movement.

According to an exemplary embodiment of the present invention the plurality of smart devices may include two or more of a smart phone, smart watch, a tablet computing device, smart glasses, or a smart wearable device.

According to an exemplary embodiment of the present invention one of the plurality of smart devices may include a near-field intrabody communication device for communicating data to another smart device not associated with the person.

According to an exemplary embodiment of the present invention the message handling module may redirect a current message directed to the person to another device proximal to the person and not associated with the person.

Exemplary embodiments of the present invention provide a method of message delivery among a plurality of smart devices associated with a person includes receiving current device status of each of the smart devices and determining a chosen smart device to receive a current message directed to the person based on criteria including the current device status.

Exemplary embodiments of the present invention provide a computer program product for dynamically adjusting an emergency coordination simulation system. The computer program product includes a computer readable storage medium having program instructions embodied therewith, the program instructions executable by a processor to cause the processor to receive current device status of each of the smart devices and determine a chosen smart device to receive a current message directed to the person based on criteria including the current device status.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION

Individuals may carry multiple personal devices or smart devices. Smart devices may be manufactured by different vendors or manufacturers. For example, an individual may carry a smart phone, a smart watch or another head-mounted display and smart glasses simultaneously, and each smart device may be capable of receiving the data, messages, alerts or communications. Smart devices may be connected to each other in a variety of combinations. For example, a smart watch and smart glasses may each be connected to a smart phone. The smart devices may be connected to each other by WiFi, a Bluetooth connection or another short range wireless connection. The terms "smart device," "wearable tech," "pervasive device" and "personal device" may be used interchangeably herein.

Each smart device carried by an individual may be capable of receiving a message or other information transmitted to the user. However, receiving such a message on each smart device may be redundant when the user is simultaneously carrying multiple smart devices. Exemplary embodiments of the present invention may provide systems and methods for delivering messages to a plurality of smart devices, even when each of the smart devices is manufactured by a different manufacturer.

An exemplary embodiment of the present invention may provide a system and method for delivering of messages based various criteria, to various paired pervasive devices and/or multiple devices that are typically worn on a person's body. A Trans-Vendor Service System may manage the flow of information to multiple personal devices that are typically closely associated with a person, such as a head-mounted display and a smart watch. The system and method according to exemplary embodiments of the present invention may detect and evaluate electronic calendars, relative battery life/device duration, relative device security, and message type or characteristics. Messages sent to a person may be shuttled to and/or displayed on (or rendered as audio on) such devices.

The Trans-Vendor Service System may determine the current device ensemble associated with a user, along with relevant electronic calendar information. The Trans-Vendor Service System may monitor relative movements of the wearable devices to optimize message placement. Individuals other than the person carrying the personal devices may determine the optimal recipient device for a message.

Higher priority messages may be immediately made available to users in an "optimized" fashion. Lower priority messages may be "saved" to be viewed when the user has more time and/or fewer distractions, or based on user determined preferences.

Exemplary embodiments of the present invention will be described in more detail below with reference to the accompanying drawings. Like reference numerals may refer to like elements throughout the specification and drawings.

Figure 1:
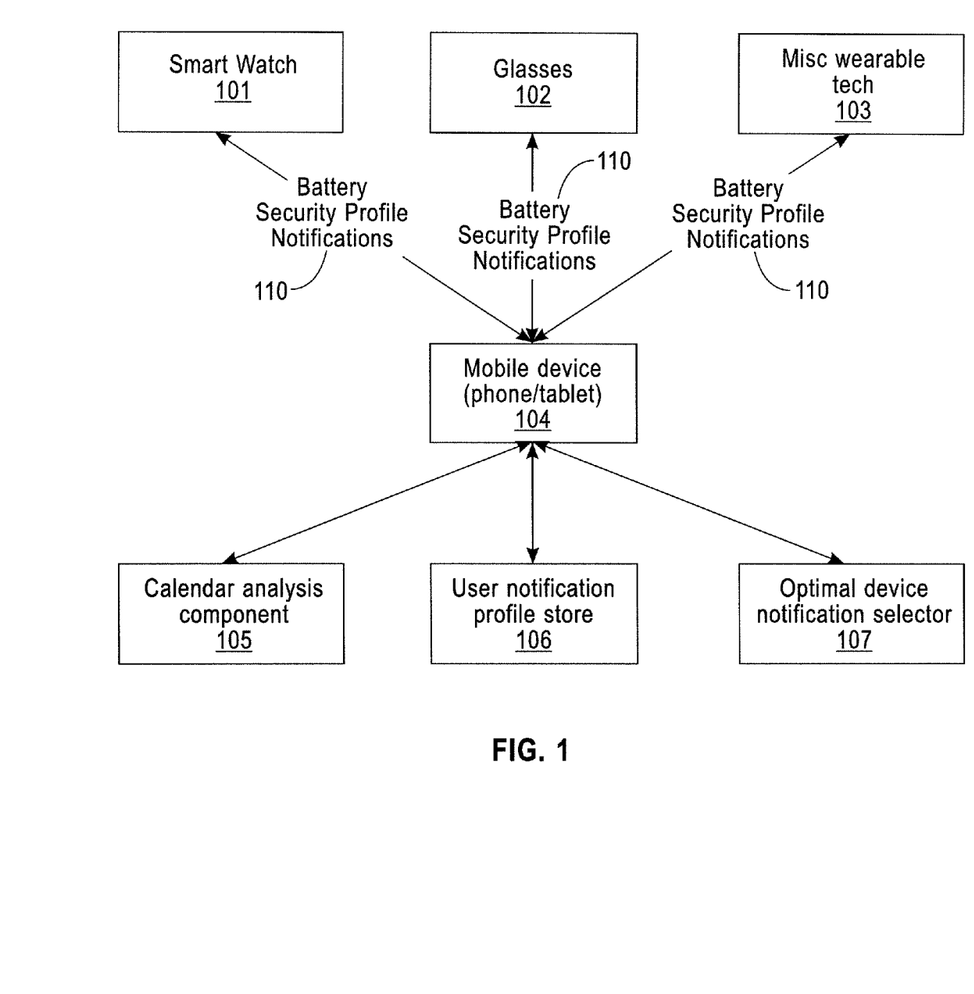
FIG. 1 illustrates a message delivery system according to an exemplary embodiment of the present invention.

FIG. 1 illustrates a message delivery system according to an exemplary embodiment of the present invention.

Referring to FIG. 1, a message delivery system according to an exemplary embodiment of the present invention may include one or more smart devices. The one or more smart devices may include a smart watch 101, glasses 102 (e.g., smart glasses) or one or more other miscellaneous wearable technology 103. The glasses 102 may be a head-mounted display device. The one or more smart devices may include a mobile device 104, such as a smart phone or a tablet computer. The mobile device 104 may be connected to and may communicate with the smart watch 101, the glasses 102 (e.g., smart glasses) and the one or more other miscellaneous wearable technology 103.

The mobile device 104 may include a data collecting module which collects data from each of the one or more smart devices. The mobile device 104 may detect a battery level and security profile notifications 110 of each of the one or more smart devices.

The message delivery system according to an exemplary embodiment of the present invention may include a calendar analysis component 105, a user notification profile storage component 106 and a device notification selector 107.

The calendar analysis component 105 may optionally determine relevant electronic calendar information (e.g., is the user in an important meeting as determined by one or more user calendars from one or more smart devices). For example, calendar information may include time of meetings, names and nature of attendees, meeting topics (e.g., topics gleaned from text in the calendar information), meeting modality (e.g., phone, video, face-to-face, etc.), and calendar information that actually specifies message placements on wearable technology. The calendar may indicate the nature and importance of a meeting, and may intelligently inform the message delivery system to present messages on particular devices, based on factors such as to minimize disruption, or maximize a user's attention.

The user notification profile storage component 106 may store one or more preferences (e.g., user' preferences) or rule sets provided by the user of the message delivery system. For example, the user may prefer that any incoming message is delivered to the user's smart glasses 102 when the smart glasses 102 are being worn by the user, but not if the user has removed the smart glasses 102 from the user's head. The user notification profile storage component 106 may store user preferences indicating that the incoming message be delivered to whichever personal device has the longest remaining battery life. The user notification profile storage component 106 may store user preferences indicating that high priority messages are delivered to all available devices, regardless of what the user's calendar indicates regarding the user's current activity or availability. User profiles may be used, including user preferences regarding the user's particular ability to handle distractions. Thus, messages may be selectively placed into a user's "cognitive space" according to a user's particular profile settings.

The device notification selector 107 may determine which device or devices to send a particular message to. The device or devices receiving a particular message may be based on information included in the user's calendar, as evaluated by the calendar analysis component 105 and/or based on the user's notification profile, as determined by the user notification profile storage component 106.

According to an exemplary embodiment of the present invention, device-destination control can be extended to a sender of a message. For example, the system and method according to exemplary embodiments of the present invention may allow a sender of a message to indicate which type of device to deliver to if multiple devices are synched. A message, such as a text message for example, might include additional meta data [e.g., {deviceDeliveryOrder: ["smart-watch", "glasses", "cellphone", "all"]}). When the message arrives in the receivers' (user's) device(s), the user's device(s) may recognize the meta data provided by the sander and try to deliver the message to those stated devices in the requested order. A user's profile settings may override the sender's ability to influence or control message delivery.

According to an exemplary embodiment of the present invention, a particular message may be delivered according to or in consideration of the type of message being delivered. The type of message may include, for example, email, instant message, SMS message, push notification, calendar alert, or a reminder. Handling of a message based on the type of message may be determined based on user preferences. Message type may include a degree of message urgency. For example, the message may be urgent, high importance, regular, or low priority. Individuals sending the message may determine the message type or individuals receiving the message may determine the message type. Messages may be categorized according to a relative time scale. For example, the importance of a message may increase as a due date related to the message approaches.

According to an exemplary embodiment of the present invention, if a user does not acknowledge receipt of a message at one device, the system may then deliver the message to another device (e.g., after a desired amount of time). For example, the message might first be delivered to a cell phone. If the phone is in the user's pocket, the user might not see the message. After 2 minutes, the system may also send the message to the user's smart watch or another device.

The mobile device 104 may include a Trans-Vendor Service System according to exemplary embodiments of the present invention. That is, the Trans-Vendor Service System according to exemplary embodiments of the present invention may be a software application stored on the mobile device 104. The Trans-Vendor Service System is described below in more detail. The Trans-Vendor Service System may include the calendar analysis component 105, the user notification profile storage component 106 and the device notification selector 107.

Figure 2:
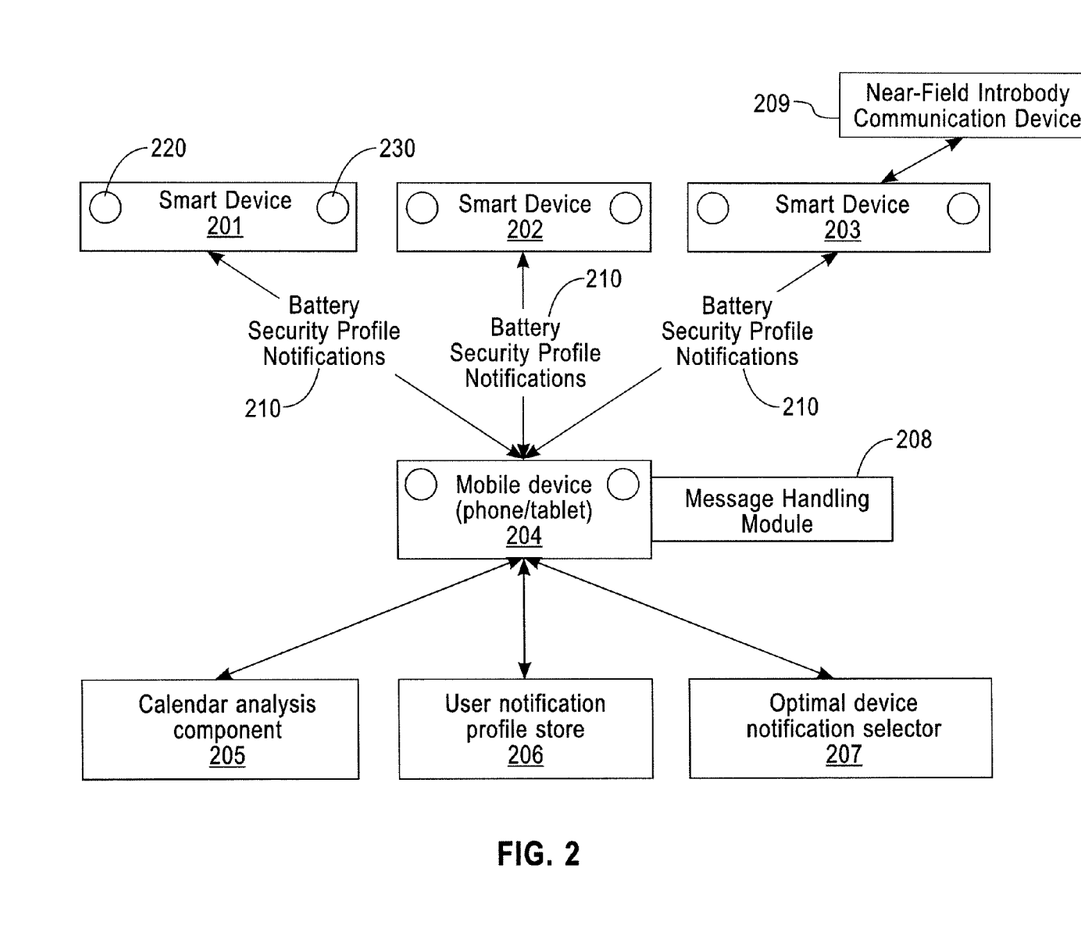
FIG. 2 illustrates a message delivery system according to an exemplary embodiment of the present invention.

FIG. 2 illustrates a message delivery system according to an exemplary embodiment of the present invention.

Referring to FIG. 2, a message delivery system according to an exemplary embodiment of the present invention may include a plurality of smart devices (e.g., smart devices 201, 202 and 203) associated with a person.

The one or more smart devices may include a mobile device 204, such as a smart phone or a tablet computer. The mobile device 204 may be connected to and may communicate with the smart devices 201, 202 and 203. The smart devices 201, 202 and 203 may each be the smart watch 101, the glasses 102 (e.g., smart glasses) and the one or more other miscellaneous wearable technology 103. Each of the smart devices may include a motion detector 220, such as an accelerometer. The motion detector 220 may detect the relative positions of each smart device. For example, the motion detector 220 may determine that a smart phone is disposed in a user's pocket, while smart glasses are currently disposed on a user's head be detecting the relative positions of each of the smart devices with respect to each other or with respect to a reference point. The motion detector 220 may detect when a smart device is moved to a new location, such as when a smart watch is removed and placed on a table, or when smart glasses are removed and placed in a user's shirt pocket.

Each smart device may include the person's contact information and a wireless transceiver 230 for communicating with each of the other smart devices and communicating messages directed to the person.

The mobile device 204 may include a data collecting module which collects data from each of the one or more smart devices. The mobile device 204 may detect a battery level and security profile notifications 210 of each of the one or more smart devices.

The message delivery system according to an exemplary embodiment of the present invention may include a calendar analysis component 205, a user notification profile storage component 206 and a device notification selector 207. The calendar analysis component 205, the user notification profile storage component 206 and the device notification selector 207 may be substantially the same as the calendar analysis component 105, a user notification profile storage component 106 and a device notification selector 107, respectively, described above with reference to FIG. 1. Thus, duplicative descriptions of the calendar analysis component 205, the user notification profile storage component 206 and the device notification selector 207 may be omitted.

The message delivery system according to an exemplary embodiment of the present invention may include a message handling module 208 and a Near-Field Introbody Communication Device 209.

The message handling module 208 may include stored codes executable by a processor embedded within one of the smart devices to receive current device status of each of the smart devices and to determine a smart device to receive a current message directed to the person based on criteria including the current device status.

The message handling module 208 may include a comparator that compares a current state of the dynamic preferences to one or more permissions of a message. The message handling module 208 may include a router that re-routes the message to one or more of the personal devices that have a profile that matches the current state of the dynamic preference. The message handling module 208 may redirect a current message directed to the person to another device proximal to the person and not associated with the person.

The near-field introbody communication device 209 may communicate data to another smart device not associated with the person. The near-field introbody communication device 209 may be used to shuttle a message received on one user's mobile device 204 to one or more of another user's smart device. For example, if the one user's mobile devices are all close to exhausting their battery life, than the received message may be directed to the smart device of a trusted contact in the general vicinity of the one user. The near-field introbody communication device 209 may employ a Personal Area Network (PAN). The PAN is described below in more detail.

According to an exemplary embodiment of the present invention the criteria may include information entered in one or more calendars stored in one or more of the smart devices.

According to an exemplary embodiment of the present invention the criteria may include an extent of accessibility of the smart devices.

According to an exemplary embodiment of the present invention current device status may include status of a smart device's power source.

According to an exemplary embodiment of the present invention device status may include device on or off.

According to an exemplary embodiment of the present invention the criteria may include the person's notification profile.

According to an exemplary embodiment of the present invention the information entered in one or more calendars may include at least one of time of meeting, names, titles, nature of attendees, or meeting topics.

According to an exemplary embodiment of the present invention the criteria may include a confidence level that the person is attempting to access one or more smart devices.

According to an exemplary embodiment of the present invention the criteria may include stored data representing the person's repeated places of travel or repeated patterns of movement.

According to an exemplary embodiment of the present invention the plurality of smart devices includes two or more of a smart phone, smart watch, a tablet computing device, smart glasses, or a smart wearable device.

Figure 3:
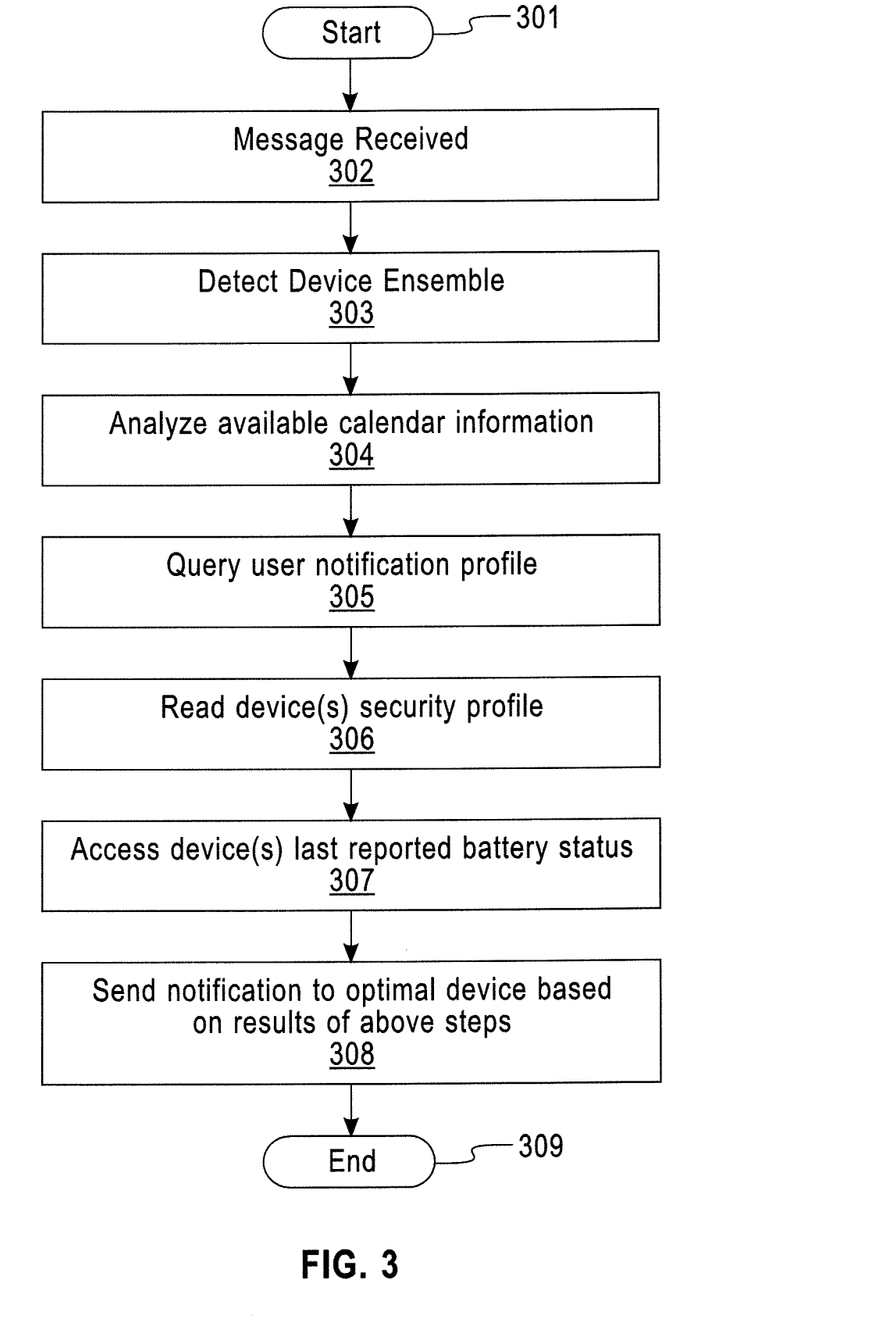
FIG. 3 illustrates a flow chart of a method of message delivery according to an exemplary embodiment of the present invention.

FIG. 3 illustrates a flow chart of a method of message delivery according to an exemplary embodiment of the present invention.

Referring to FIG. 3, a method of message delivery according to an exemplary embodiment of the present invention may be performed by the Trans-Vendor Service System, which is described below in more detail with reference to FIG. 4. Message delivery may start 301 when a message is received 302. The Trans-Vendor Service System may detect a device ensemble 303. The Trans-Vendor Service System may determine a current device ensemble associated with the user (e.g., worn on a user's body and turned on). The Trans-Vendor Service System may analyze available calendar information 304. The Trans-Vendor Service System may optionally determine relevant electronic calendar information (e.g., is the user in an important meeting as determined by one or more user calendars from one or more vendors). The calendar information may include time of meetings, names and nature of attendees, meeting topics (e.g. gleaned from text in the calendar information), meeting modality (e.g. phone, video, or face-to-face), and calendar information that actually specifies message placements on wearable technology. The Trans-Vendor Service System may query a user notification profile 305. The Trans-Vendor Service System may read the device(s) security profile(s) 306. The Trans-Vendor Service System may optionally determine relative device security (e.g. does a device have a password). The Trans-Vendor Service System may access the device(s) last reported battery status 307. The Trans-Vendor Service System may optionally determine relative battery life and device duration before losing power. The Trans-Vendor Service System may send the notification to the optimal device based on the results of the above steps 308. The process may end 309 when an output is made to one or more of the wearable devices.

According to an exemplary embodiment of the present invention, the optimal device to which a message is sent may be based on an assessment of electronic calendars, relative battery life, message type, user cognitive load, and/or relative device security. Messages may be delivered to and/or displayed on (or rendered as audio on) one or more of the user's smart devices. A message optimization process may include the Trans-Vendor Service System determining the current device ensemble associated with a user as well as relevant electronic calendar information (e.g. is the user in an important meeting as determined by one or more user calendars from one or more vendor software apps). For example, the calendar may indicate the nature and importance of a meeting. Messages may be selectively delivered to one or more of a user's devices based on factors such as to minimize disruption, or to maximize user's attention. User profiles may be used, including user preferences regarding ability to handle distractions or attention level. The Trans-Vendor Service System may monitor relative movements of the wearable devices to optimize message placement.

According to an exemplary embodiment of the present invention, people other than the user, such as people in the vicinity of the user may determine the optimal recipient-device for a message to be delivered to (e.g., by crowd sourcing, so that the user is not so bothered in a meeting). The Trans-Vendor Service System may optionally make use of personal area networks (PANs). PANS may employ near-field intra-body and inter-body communication. PANs are described in more detail below with reference to FIGS. 4 to 6.

A user's smart devices may be personal computing devices physically attached to a person or within a relatively small proximity to the user (e.g., less than an arm's length=~4 ft) of a person or within earshot of a person (e.g., ~6 ft). The Trans-Vendor Service System may evaluate the relative position of the user's devices (e.g., relative to the user, other devices, and nearby objects), the movement of the devices (e.g., swinging, standing still, or moving in an upward or downward direction), the state of security of the devices (e.g., locked, on, or off), and the usage history of the devices by the person (e.g., recent call, or recent text). The Trans-Vendor Service System may execute rules including, for example, denying access to a "distracting device" when the user is driving a vehicle and may re-route the message to a third party (e.g., a passenger, or a hands-free car system).

According to an exemplary embodiment of the present invention the Trans-Vendor Service System may include an activity inference module that classifies the use data to determine the user activity at the time of device usage such as driving, walking, and running. The Trans-Vendor Service System may monitor relative movements of the wearable devices to optimize message placement.

Figure 4:
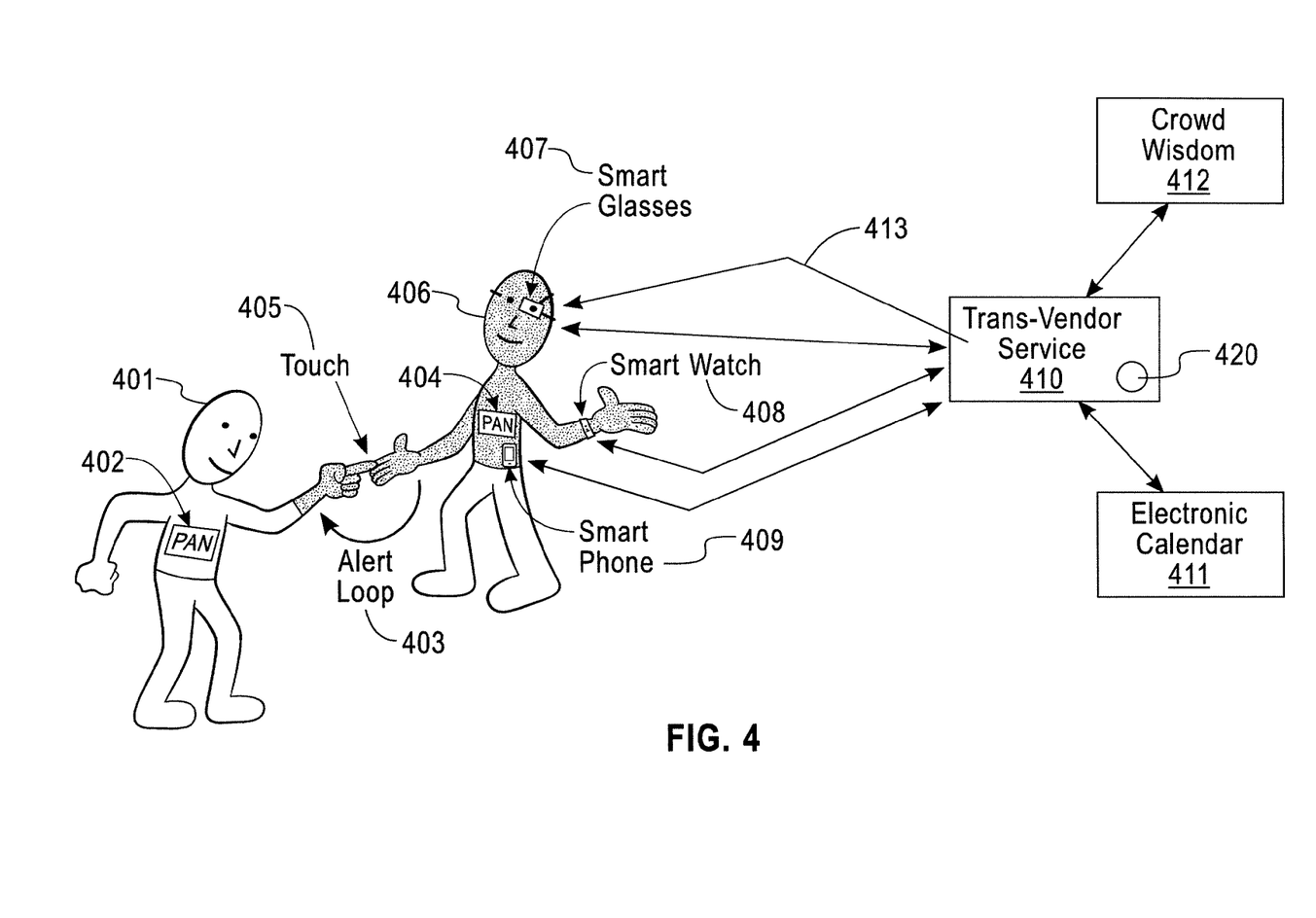
FIG. 4 illustrates a Personal Area Network (PAN) and a Trans-Vendor Service System according to an exemplary embodiment of the present invention.
Figure 5:
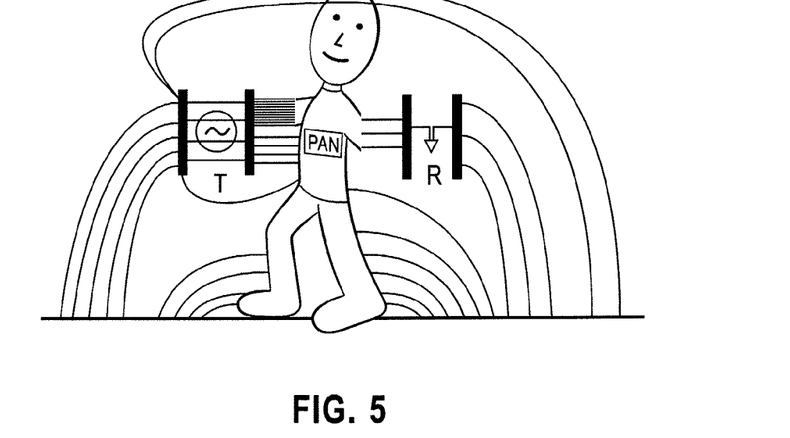
FIG. 5 illustrates an exemplary electric field produced by a PAN transmitter according to an exemplary embodiment of the present invention.
Figure 6:
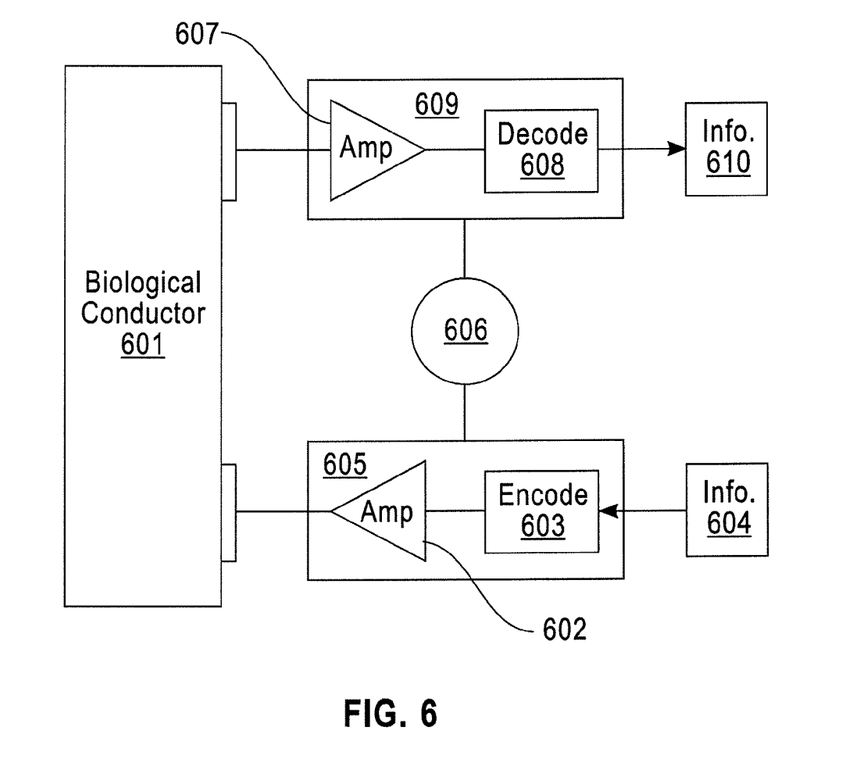
FIG. 6 illustrates a PAN transmitter coupled to a biological conductor according to an exemplary embodiment of the present invention.

FIG. 4 illustrates a Personal Area Network (PAN) and a Trans-Vendor Service System according to an exemplary embodiment of the present invention. FIG. 5 illustrates an exemplary electric field produced by a PAN transmitter according to an exemplary embodiment of the present invention. FIG. 6 illustrates a PAN transmitter coupled to a biological conductor according to an exemplary embodiment of the present invention.

Referring to FIGS. 4 to 6, an alert or a message may be received by a first individual 401 or a second individual 406. Each of the first and second individuals 401 and 406 may be carrying an ensemble of devices (e.g., smart glasses 407, smart watch 408 and/or smart phone 409) currently associated with him or her (e.g. being worn on his or her body).

According to an exemplary embodiment of the present invention, a personal area network (PAN) may be formed for each of the first and second individuals 401 and 406. A first PAN 402 may be formed around the first individual 401 and a second PAN 404 may be formed around the second individual. A PAN may refer to a near-field intrabody communication network. A PAN may allow, for example, users to exchange electronic business cards by shaking hands via an alert loop 403 formed by touch 405 contact between the first and second individuals 401 and 406. A PAN may also allow a plurality of smart devices carried by an individual to communicate with each other. A PAN may also allow one or more of a plurality of devices carried by a first user to communicate with one or more of a plurality of devices carried by a second user.

According to an exemplary embodiment of the present invention, a PAN system may increase a confidence value C regarding which of a user's devices are turned on, or may be used to transfer information or messages between users (e.g., the first and second individuals 401 and 406). The PAN system according to exemplary embodiments of the present invention may be used to convey relevant electronic calendar information, user profile, relative device security, relative battery life and device duration before losing power, and user preferences. For example, if the first individual 401 shakes hands with the second individual 406, this may convey a message from the first individual 401 to the second individual 406. The PAN system according to exemplary embodiments of the present invention may also execute user preferences that a particular message should be shuttled to certain devices based on some of the considerations such as battery life, preferences, security, readability of font size, distraction level, or user attention level.

According to an exemplary embodiment of the present invention, information may be shared or shifted between individuals by interbody-alarm shifting. Various alarms on various devices associated with a user may be shuttled to various devices, based on the criteria described herein (e.g., user preferences, or availability based on calendar information). In some cases, these alarms may be shuttled to user devices on other persons in the vicinity. For example, if a first user's watch alarm is about to sound, but the watch battery is low in power; the alarm might be sent to a second person that the first user is speaking with to cause a loud sound and bright flash on the second user's device. Such an alarm may optionally be an absolute alarm and/or a relative alarm.

According to an exemplary embodiment of the present invention, when using the PAN during a handshake, a user may disable the alarm of a partner in the shake. For example, a user may desire to not have audio interruptions during a conversation, talk, or meeting with sensitive content. Thus, the user may select user preferences that recognize the handshake with a particular person, and disable all alarms until a certain time or event occurs (e.g., a second handshake indicating the meeting is over). The user preferences may be stored in the Trans-Vendor Service System described herein.

A Trans-Vendor Service System 410 according to an exemplary embodiment of the present invention may manage the flow of information (e.g., messages) to multiple personal devices. For example, The Trans-Vendor Service System 410 may deliver a message 413 to a particular smart device, such as the smart glasses 407. The Trans-Vendor Service System 410 may be substantially the same as the Trans-Vendor Service System described above. The Trans-Vendor Service System 410 may be a software application. The Trans-Vendor Service System 410 may be stored on a smart device such as a smart phone, in the cloud or on a physical server accessible by one or more of the smart devices described herein.

The Trans-Vendor Service System 410 may incorporate information from an electronic calendar 411. The electronic calendar 411 may include relevant electronic calendar information (e.g., is the user in an important meeting as determined by one or more user calendars from one or more smart devices). For example, calendar information may include time of meetings, names and nature of attendees, meeting topics (e.g., topics gleaned from text in the calendar information), meeting modality (e.g., phone, video, face-to-face, etc.), and calendar information that actually specifies message placements on wearable technology. The calendar may indicate the nature and importance of a meeting, and may intelligently inform the message delivery system to present messages on particular devices, based on factors such as to minimize disruption, or maximize a user's attention.

The Trans-Vendor Service System 410 may incorporate information from a crowd wisdom module 412. The crowd wisdom module 412 may monitor feedback from others in the vicinity of the user, for example, when other people become angry that a user is receiving messages or attending to various devices on his/her body. "Votes" of these people may also be considered when determining optimal placement of messages for a particular user. The votes may come from people who are in the audience when someone is giving a talk, such as at a cafeteria table, a videoconference, or in an auditorium.

The Trans-Vendor Service System 410 may include a motion detector 420, which may monitor relative movement between a wearable device and the portion of the body wearing the device, and monitor an indication of the relative movement of the device. The Trans-Vendor Service System 410 may detect, with confidence level C, that a user is attempting to use one or more wearable devices, or that the user is not able to access a device in a convenient fashion. Based on this assessment, a user may show a preference for a watch over a head-mounted display in certain situations, as does the overall population in the user's demographic. Thus, in some cases, The Trans-Vendor Service System 410 may use this information in decision making with respect to where to send a message and how the message is presented (e.g. graphics, voices, colors, or whispers in ear)

The Trans-Vendor Service System 410 according to exemplary embodiments of the present invention may employ machine learning to evolve useful profiles or preferences.

Referring to FIG. 5, PANs near the human body can exchange digital information by capacitively coupling picoamp currents through the body. A low-frequency carrier (e.g., less than 1 megahertz) may be used so little or no energy is propagated. Electric fields may be transmitted through a person's body to form the PAN. The PAN may include a transmitter T and a receiver R. FIG. 5 illustrates exemplary electric fields produced by the PAN transmitter T.

Referring to FIG. 6, a transmitter 605 may apply a current to a biological conductor 601 and to a receiver 609. The transmitter 605 may apply the current in response to first information 604 and the receiver 609 may receive second information 610 from the biological conductor 601. The transmitter 605 may include an encoding module 603 and the receiver 609 may include a decoding module 608. The transmitter 605 may include a transmission amplifier 602 and the receiver 609 may include a receiving amplifier 607. The transmission amplifier 602 and the receiving amplifier 607 may each be connected to a ground 606. The biological conductor 601 according to an exemplary embodiment of the present invention may be a user's body.

The Trans-Vendor Service System according to an exemplary embodiment of the present invention may be a software application. The Trans-Vendor Service System may be stored on a smart device such as a smart phone, in the cloud or on a physical server accessible by one or more of the smart devices described herein. For example, the Trans-Vendor Service System according to an exemplary embodiment of the present invention may be stored on a computer system that is not in the same physical locations as the smart devices described herein, and the smart devices described herein may access the Trans-Vendor Service System through an internet connection.

Figure 7:
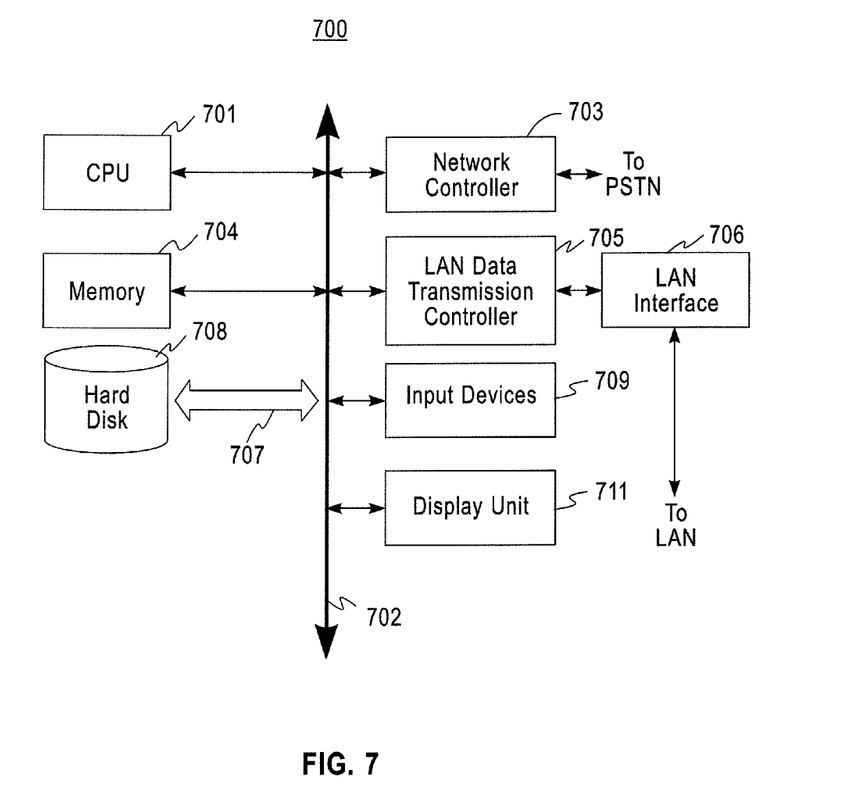
FIG. 7 illustrates an example of a computer system capable of implementing the method according to exemplary embodiments of the present invention.

FIG. 7 illustrates an example of a computer system capable of implementing the method according to exemplary embodiments of the present invention. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 700 may include, for example, a central processing unit (CPU) 701, random access memory (RAM) 704, a display unit 711, a local area network (LAN) data transmission controller 705, a LAN interface 706, a network controller 703, an internal bus 702, and one or more input devices 709, for example, a keyboard, mouse etc. As shown, the system 700 may be connected to a data storage device, for example, a hard disk, 708 via a link 707.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

Figure 8:
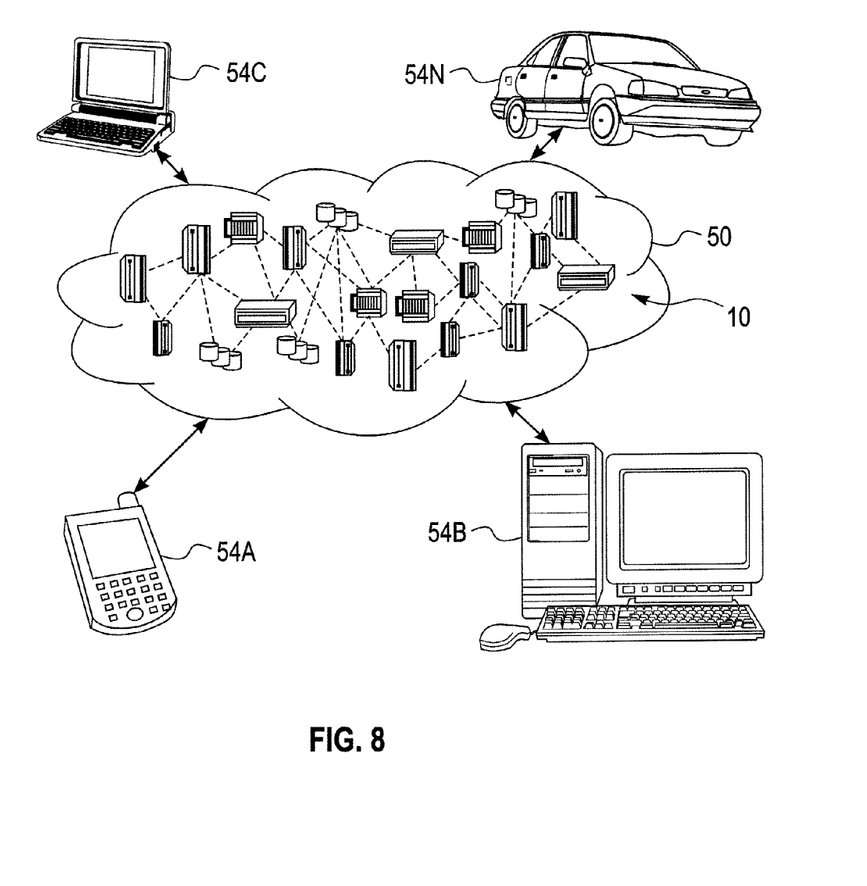
FIG. 8 depicts a cloud computing environment according to an embodiment of the present invention.
Figure 9:
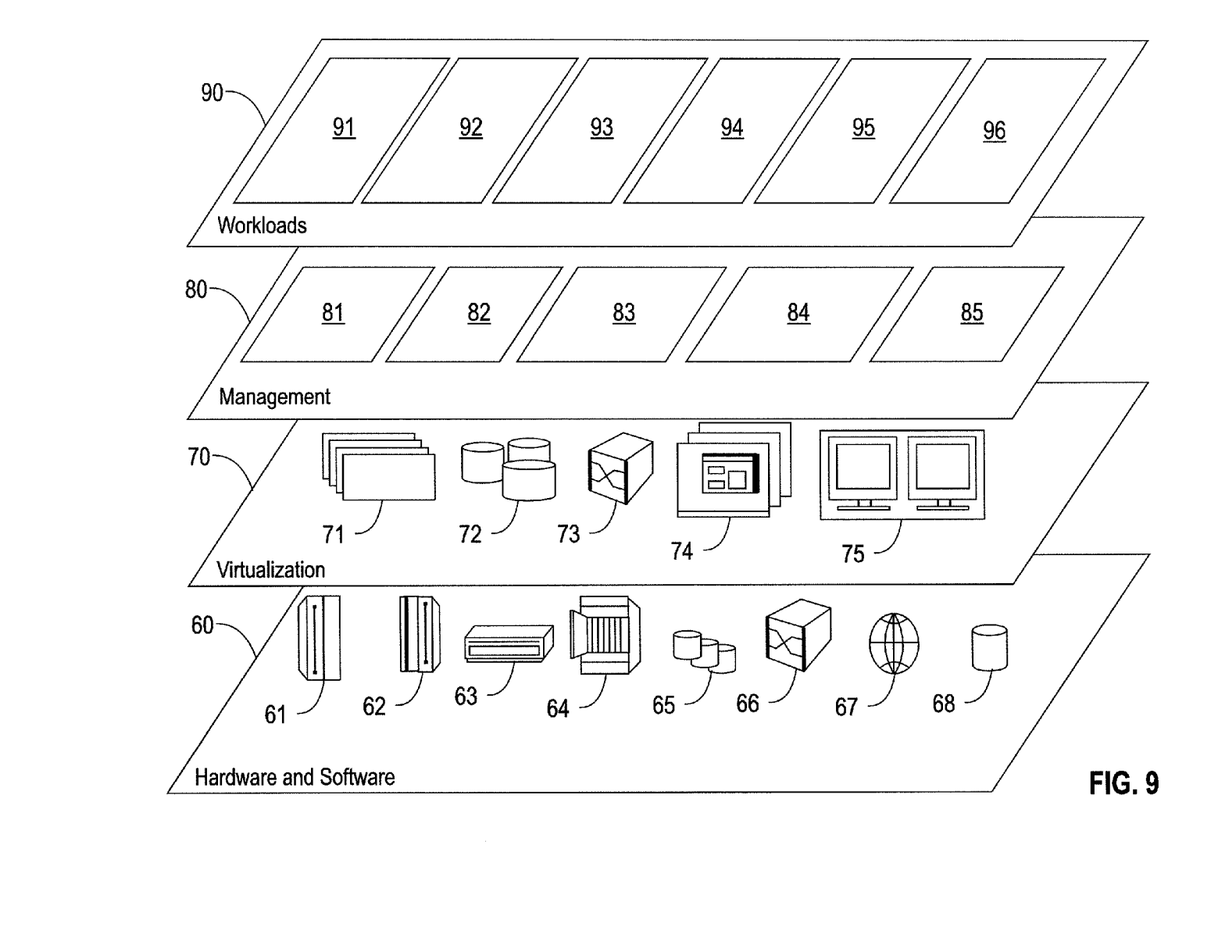
FIG. 9 depicts abstraction model layers according to an embodiment of the present invention.

FIG. 8 depicts a cloud computing environment according to an embodiment of the present invention. FIG. 9 depicts abstraction model layers according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (see, e.g., FIGS. 1 to 3).

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message delivery determination 96. Message delivery determination 96 may be carried out by the Trans-Vendor Service System according to exemplary embodiments of the present invention.

First Exemplary Scenario

Wearable Technology—Mobile Phone, Augmented Reality Glasses, and a Smart Watch.

User Context—User may be walking around as detected by phone, glasses and watch. Watch detects that the arm the watch is attached to is not swinging with the body and determines that the user is carrying something in that arm. Mobile phone has detected based on proximity that it is in the opposite pocket from the watch hand. (Alternatively, the system may detect that the arm is positioned in such a way that the user is likely looking at the watch, and it may or may not be advantageous to show an alert on the watch.)

Notification Preference—Default notification type for received message is smart watch.

Automatic Routing—Because the watch detects the user is walking and carrying something the watch notifies other devices that it should not respond to the message type. Messages are instead rerouted to the glasses so the user can receive the notification. In some systems, based on preferences the mobile phone might receive the notification because it is in the opposite pocket and that user's hand might be free to view the notification.

Second Exemplary Scenario

Wearable Technology—Mobile Phone, Augmented Reality Glasses, Smart Watch.

User Context—User is in the middle of a conversation as detected by the glasses based on vibrations detected in the face.

Notification Preference—Default notification type for received message is phone.

Automatic Routing—Because the user is in the middle of a conversation, the notification is rerouted to the watch or the glasses so the user does not have to take out his phone to look at the notification, which may be considered rude.

Third Exemplary Scenario

Wearable Technology—Smart Watch, Mobile Phone, Vehicle.

User Context—User is driving a car.

Notification Preference—Default notification type for received message is phone.

Automatic Routing—The smart watch and phone detect the user is moving at a velocity consistent with driving. The smart watch determines the user is the driver because of the motions made commonly with steering a vehicle. Notifications are routed to the vehicle on board system for display as to not distract the driver with a phone. The addition of the smart watch steering detection with the mobile phone speed detection can be used to determine if a user is driving or just a vehicle occupant. Vehicle occupants would have messages delivered to their smart phones as normal.

Fourth Exemplary Scenario

A user is a salesman. The user is currently at a customer site, as automatically determined by the Trans-Vendor Service System with access to the user's electronic calendar. The user has his/her tablet, smart phone, smart watch, and smart glasses all synched together. The system receives a message alerting the user that he/she has a lunch meeting scheduled in 20 minutes across town. Rather than the user's smart phone playing an annoying noise or vibrating, the user's smart watch shows a reminder. The user casually looks down at his/her watch and continues his/her conversation with the client. An urgent email comes in from the user's boss telling the user to cancel the sale. The message is delivered to the user's smart glasses so the user is instantly made aware and the user asks to step out to call his boss.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A message delivery system comprising:
    a plurality of smart devices associated with a person, wherein each smart device of the plurality of smart devices includes the person's contact information, and wherein each smart device of the plurality of smart devices includes a wireless transceiver for communicating with each other smart device of the plurality of smart devices and communicating messages directed to the person; and
    a message handling module having stored codes executable by a processor embedded within one of the smart devices of the plurality of smart devices to receive current device status of each of the smart devices of the plurality of smart devices and to determine a chosen smart device of the plurality of smart devices to receive a current message directed to the person based on criteria including the current device status of each of the smart devices of the plurality of smart devices, wherein the current device status of at least one of the smart devices of the plurality of smart devices includes a physical location of the at least one smart device of the plurality of smart devices on the person's body.

2. The system of claim 1 wherein the criteria includes information entered in one or more calendars stored in one or more of the smart devices.

3. The system of claim 1, wherein the criteria includes an extent of accessibility of the smart devices.

4. The system of claim 1, wherein current device status includes status of a smart device's power source.

5. The system of claim 1, wherein device status includes device on or off.

6. The system of claim 1, wherein the criteria includes the person's notification profile.

7. The system of claim 2, wherein the information entered in one or more calendars includes at least one of time of meeting, names, titles, nature of attendees, or meeting topics.

8. The system of claim 1, wherein at least one of the smart devices is a wearable smart device including a motion detector for detecting movement of the wearable smart device, and wherein the motion detector detects the physical location of the wearable smart device on the person's body.

9. The system of claim 8, wherein the criteria includes a confidence level that the person is attempting to access one or more smart devices.

10. The system of claim 1, wherein the criteria includes stored data representing the person's repeated places of travel or repeated patterns of movement.

11. The system of claim 1, wherein the plurality of smart devices includes two or more of a smart phone, smart watch, a tablet computing device, a smart glasses, or a smart wearable device.

12. The system of claim 1, wherein one of the plurality of smart devices includes a near-field intrabody communication device for communicating data to another smart device not associated with the person to control an alerting device of the another smart device.

13. The system of claim 1, wherein the message handling module redirects a current message directed to the person to another device proximal to the person and not associated with the person.

14. A method of message delivery among a plurality of smart devices associated with a person, comprising:
    receiving current device status of each of the smart devices; and
    determining a chosen smart device to receive a current message directed to the person based on criteria including the current device status, wherein the current device status of at least one of the smart devices of the plurality of smart devices includes a physical location of the at least one smart device of the plurality of smart devices on the person's body.

15. The method of claim 14 wherein the criteria includes information entered in one or more calendars stored in one or more of the smart devices.

16. The method of claim 14, wherein the criteria includes an extent of accessibility of the smart devices.

17. The method of claim 14, wherein current device status includes the strength of a smart device's power source.

18. The method of claim 14, wherein device status includes device on or off.

19. The method of claim 14, wherein the message handling module is cloud-based or is stored in the cloud.

20. A computer program product for message delivery among a plurality of smart devices associated with a person, the computer program product comprising a non-transitory computer readable storage medium having program instructions embodied therewith, the program instructions executable by a processor to cause the processor to:
    receive current device status of each of the smart devices; and
    determine a chosen smart device to receive a current message directed to the person based on criteria including the current device status, wherein the current device status of at least one of the smart devices of the plurality of smart devices includes a physical location of the at least one smart device of the plurality of smart devices on the person's body.

* * * * *